Figure 1:
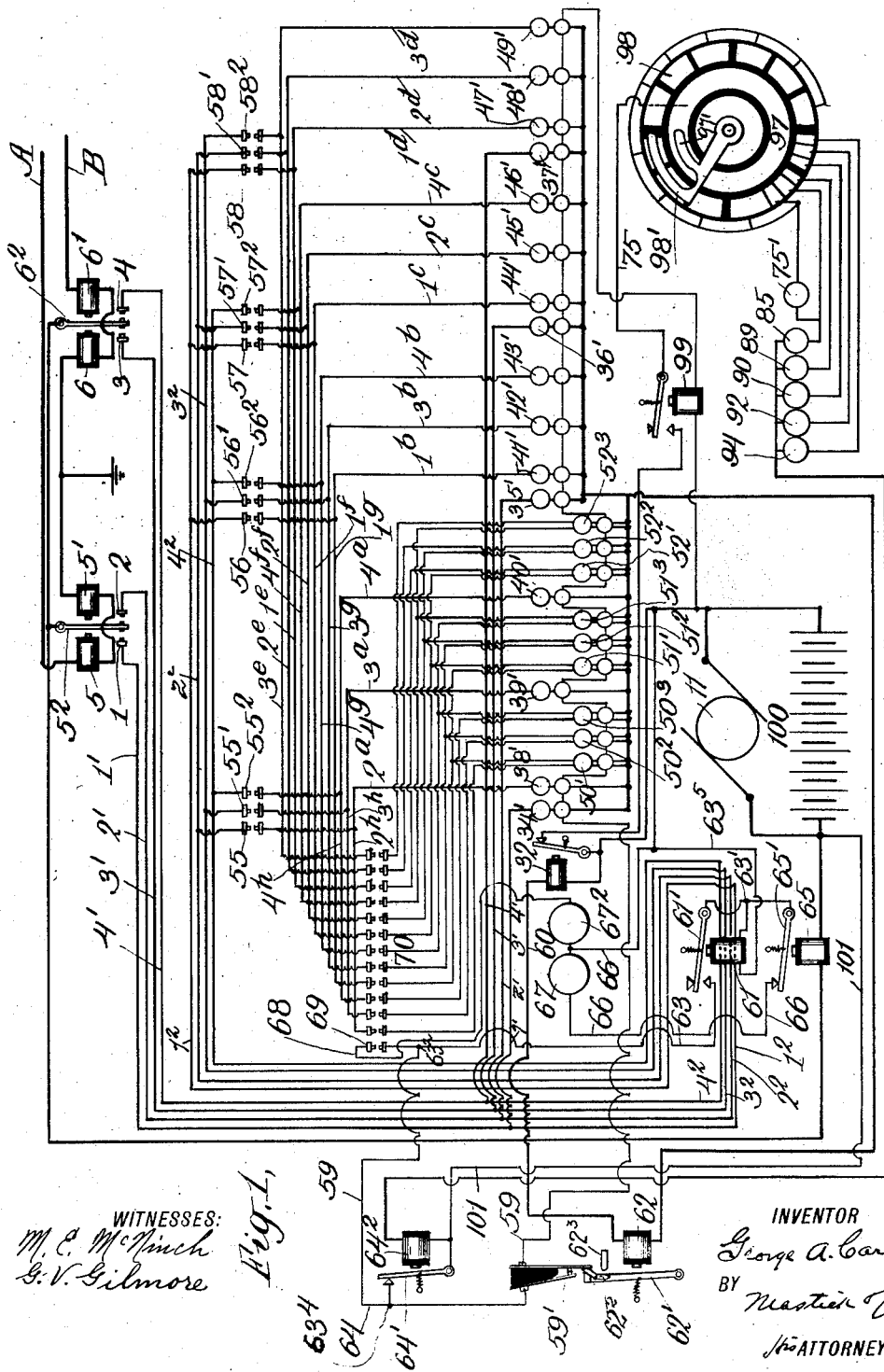

G. A. CARDWELL.
TELEGRAPH TYPE WRITER.
APPLICATION FILED MAR. 18, 1907.

905,497.

Patented Dec. 1, 1908.
7 SHEETS—SHEET 1.

WITNESSES:
M. E. McNinch
G. V. Gilmore

INVENTOR
George A. Cardwell
BY Mastick Jones
His ATTORNEYS.

G. A. CARDWELL.
TELEGRAPH TYPE WRITER.
APPLICATION FILED MAR. 18, 1907.

905,497.

Patented Dec. 1, 1908.
7 SHEETS—SHEET 3.

WITNESSES:

INVENTOR
George A. Cardwell
BY
ATTORNEYS

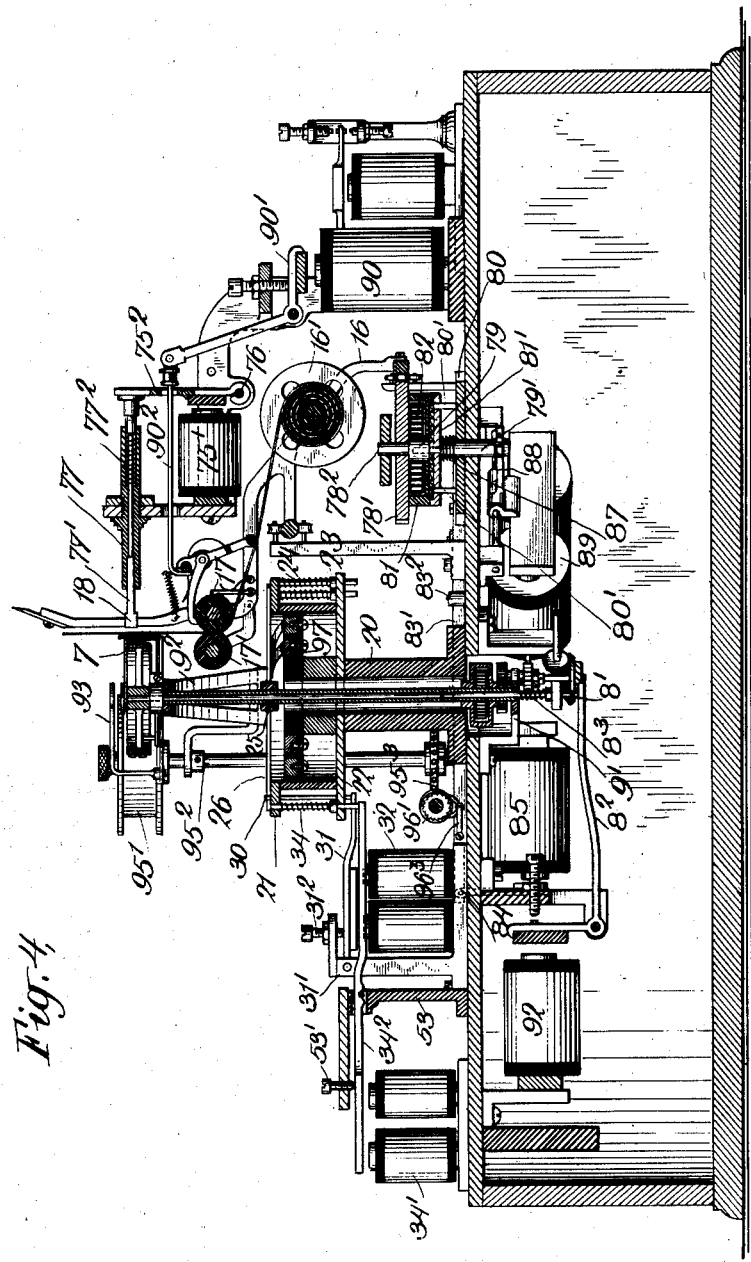

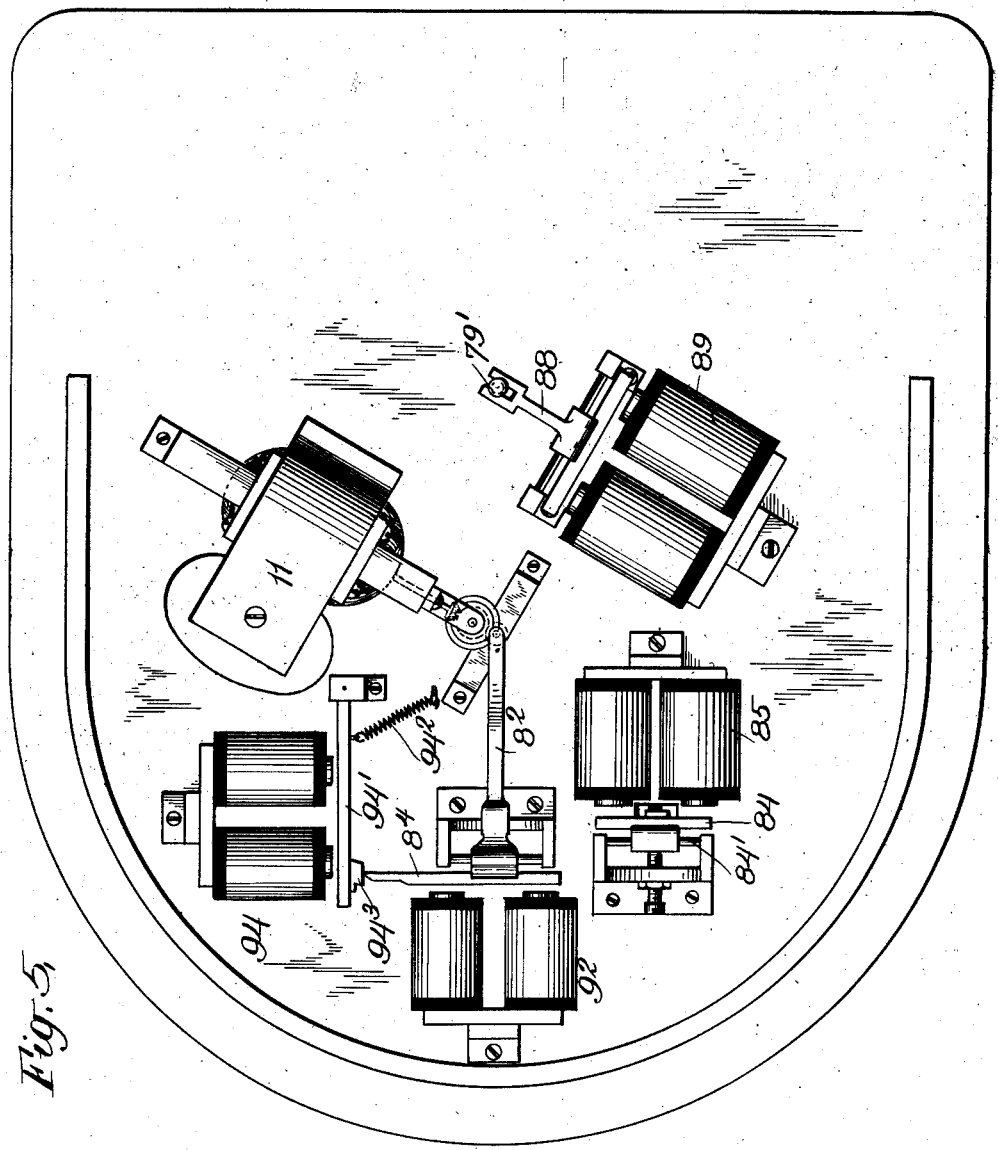

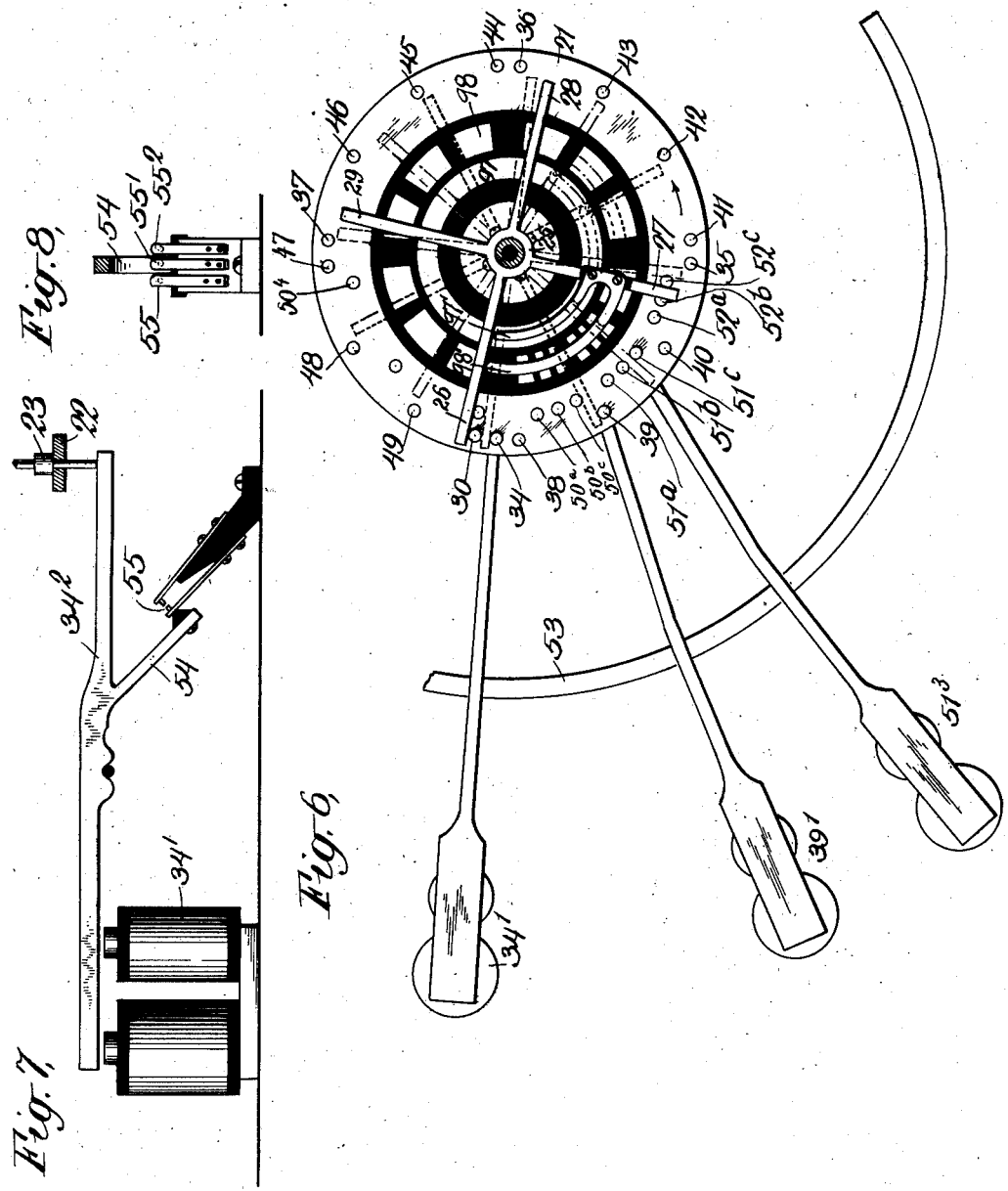

G. A. CARDWELL.
TELEGRAPH TYPE WRITER.
APPLICATION FILED MAR. 18, 1907.
905,497.
Patented Dec. 1, 1908.
7 SHEETS—SHEET 7.
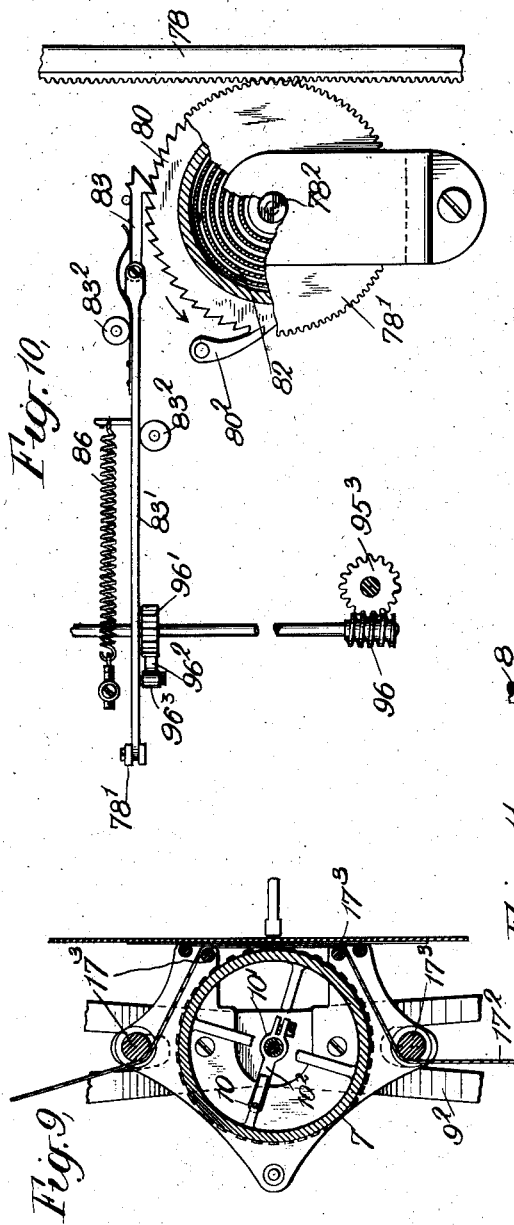
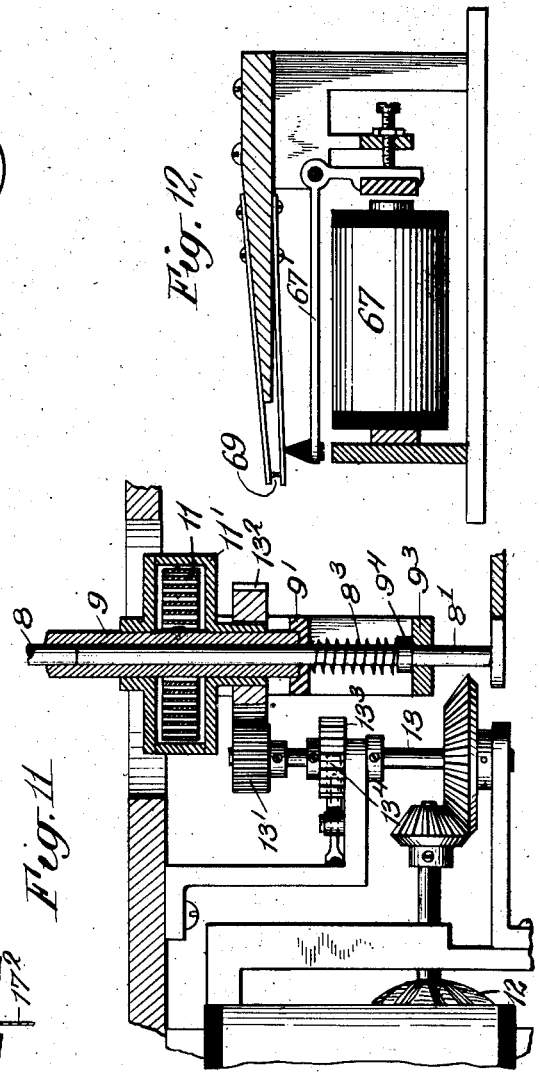
WITNESSES:
M. E. McNinch
G. V. Gilmore
INVENTOR
George A. Cardwell
BY
Mastin Jones
his ATTORNEYS

000
UNITED STATES PATENT OFFICE.

GEORGE A. CARDWELL, OF NEW YORK, N. Y., ASSIGNOR TO AMERICAN TELEGRAPH TYPE-WRITER COMPANY, OF NEW YORK, N. Y., A CORPORATION OF DELAWARE.

TELEGRAPH TYPE-WRITER.

No. 905,497.  Specification of Letters Patent.  Patented Dec. 1, 1908.

Application filed March 18, 1907. Serial No. 362,970.

*To all whom it may concern:*

Be it known that I, GEORGE A. CARDWELL, a citizen of the United States, residing at New York city, in the county of New York and State of New York, have invented certain new and useful Improvements in Telegraph Type-Writers, of which the following is a specification.

The present invention relates to a telegraph typewriter or receiving instrument operated by electrical impulses from a main line circuit to print letters or other symbols corresponding to those of the transmitting instrument. The appropriate series of electrical impulses may be impressed upon the main line circuit by any suitable instrument and according to any prearranged code or system.

In accordance with the present invention use is made of what I will for convenience term a controller inasmuch as it fixes or determines the printing position of the type wheel. This controller comprises a series of pins capable of being set or moved into the desired position by corresponding electromagnets which are energized in a predetermined sequence for each letter or other symbol, it being necessary in the form shown to utilize three impulses from the main line circuit to effect the ultimate position of the printing wheel.

Generally stated the controller forms part of a system which includes a plurality of main circuits, a plurality of secondary circuits branched from each of the main circuits, and a tertiary circuit branched from each secondary circuit, all of said circuits being normally open. The main circuits are adapted to be closed by selectable magnets responsive to a characteristic kind of impulse. In the system shown at least three impulses are required to effect the advance of the type wheel to its ultimate or printing position. Upon the coming in of the first impulse over the line circuit to close a selected main circuit, a break or gap is closed in at least one of the secondary circuits of all of the other main circuits, but no break or gap is closed in the selected main circuit. Upon the coming in of the second impulse through another selectable magnet another main circuit is closed, and the closing of said circuit closes a break or gap in at least one of the secondary circuits of the main circuits other than the particular one closed, and also closes a break or gap in the tertiary circuits to provide a closed tertiary circuit upon the coming in of the third impulse. The three successive impulses over the main line are utilized to determine three successive positions of the type wheel. The first impulse over a main circuit determines the first position of said wheel, and at the same time closes a set of secondary circuits one of which is utilized upon the coming in of the second impulse. The second impulse over a selected secondary circuit determines the second position of the printing wheel and at the same time closes a break in the tertiary circuits one of which is utilized upon the coming in of the third impulse. The third impulse over a selected tertiary circuit determines the third or ultimate position of the type wheel. Each impulse over the main line is directly utilized to effect a movement of the type wheel toward its ultimate or printing position. That is, upon the coming in of each impulse one of the controller magnets is selected and energized, and as an auxiliary operation the first and second impulses close circuits which are utilized on the coming in of the second and third impulses respectively.

The present system greatly simplifies the electrical as well as the mechanical operations involved in that the type wheel is started toward its printing position immediately upon the coming in of the first impulse and is not held back until the coming in of the last impulse. By employing a controller comprising means by which a given number of letters or other symbols are grouped according to the four quarters of the controller the type wheel is moved to the selected quarter immediately upon the coming in of the first impulse; to a division of the selected quarter upon the coming in of the second impulse; and to a subdivision of the quarter immediately upon the coming in of the third impulse, the last being the ultimate or printing position. If, for example, the selected letter lies in the fourth quarter the wheel is moved to that quarter immediately upon the coming in of the first impulse, and then in succession to the proper division and subdivision of that quarter upon the coming in of the second and third impulses respectively. The aggregate of the several movements of the type wheel is always less than the circumference of the wheel.

In addition to the system of circuits upon which my invention is primarily based I have shown the details of an instrument in order to fully explain the mechanical operations involved, it being understood that the mechanical construction may be varied so long as it is adapted to carry out the principle of the selective system herein disclosed.

Figure 2:
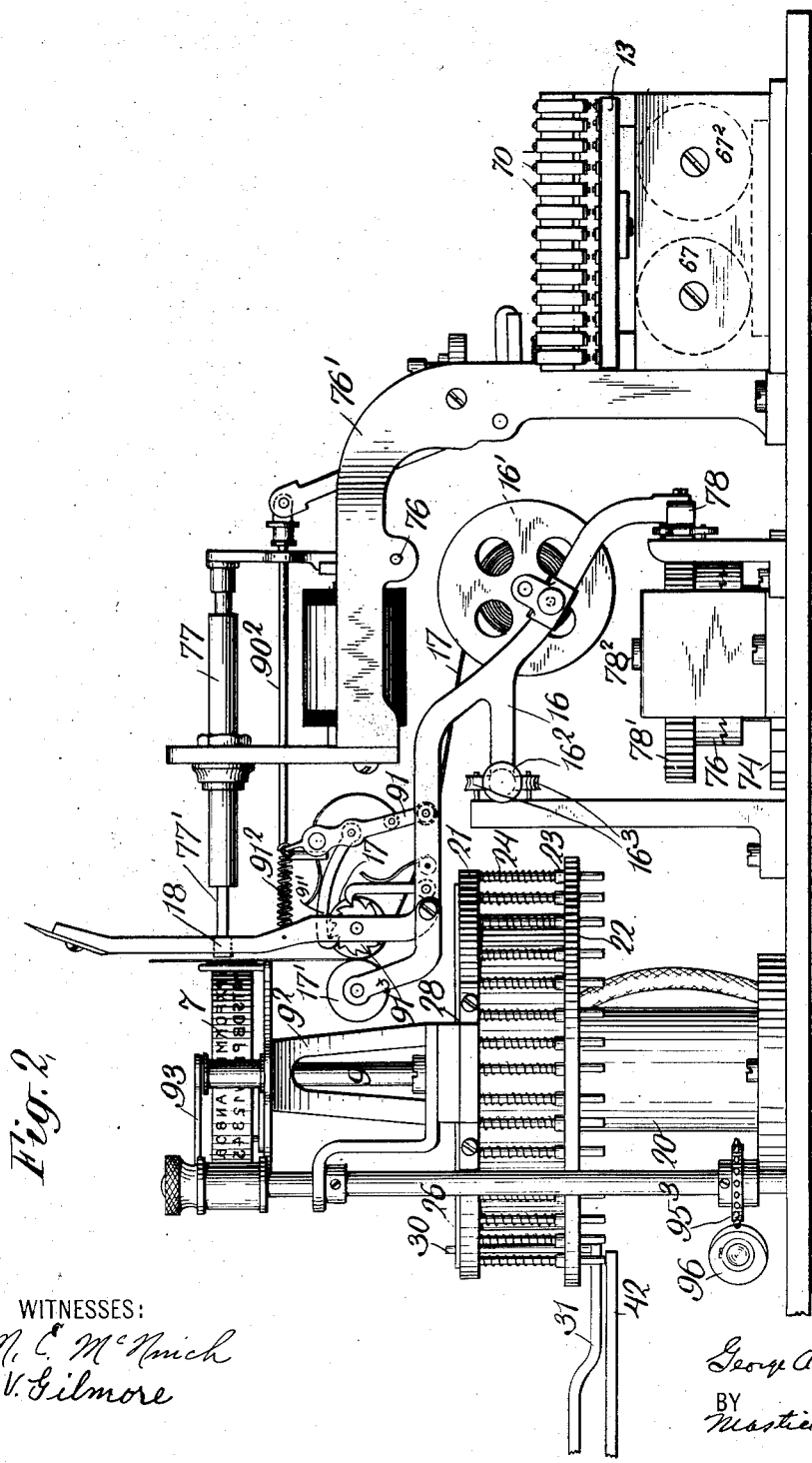
Figure 3:
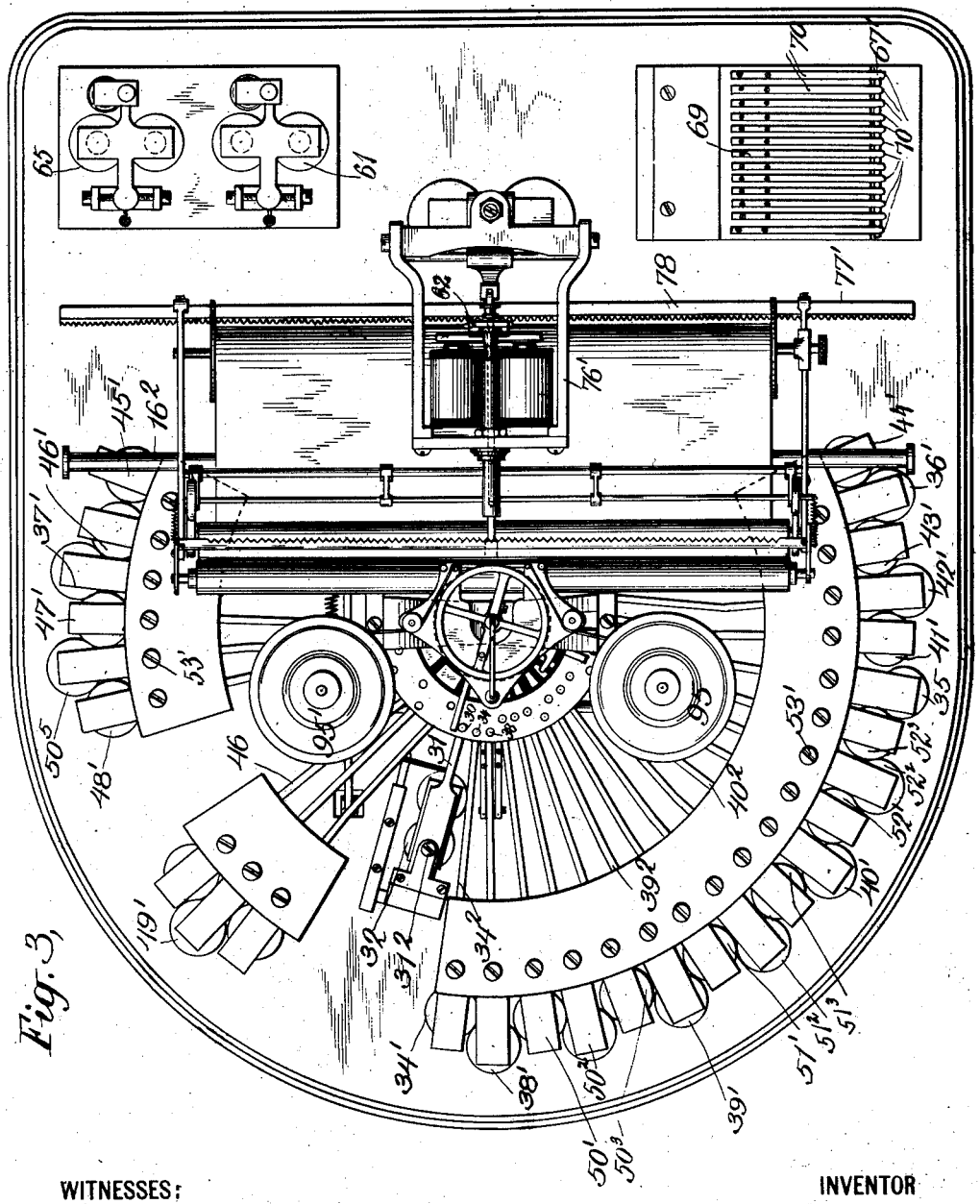

The invention will be understood by reference to the accompanying drawings in which Figure 1 is a diagrammatic view of the circuit system of the machine; Fig. 2 a side elevation of the machine; Figs. 3 and 4 a top view, and a central longitudinal section, respectively, thereof; Fig. 5 an inverted plan view of the magnets beneath the bed of the machine; Fig. 6 a detail view of the type wheel controller; Fig. 7 a detail view of one of the selectable magnets; Fig. 8 an end view of a portion of Fig. 7; Fig. 9 a top view of the type wheel; Fig. 10 a detail view of the carriage spacing mechanism and the ribbon feed; Fig. 11 a detail view of the motor mechanism for rotating the type wheel; and Fig. 12 a detail view of a relay switch included in one of the local circuits.

Similar reference numerals indicate similar parts in the several views.

Before entering upon a detailed description of the circuit system I will describe the construction of the type wheel and the controller, and the relation between them. I may state here, however, that in Fig. 1 I have shown four contacts designated respectively 1, 2, 3 and 4, the closing of any one of which effects, primarily, the setting of a controller pin. These contacts are closed respectively by means of relays 5 and 5', 6 and 6', included in the main line circuits A and B. The relays 5 and 5' are responsive to currents of different strength or polarity over the circuit A, and the relays 6 and 6' are responsive to currents of different strength or polarity over the circuit B. I may use a single line over which there may be sent as many different kinds or characters of impulses as there are relay switches; as for example, with four relays on a single line there will be a weak positive and a strong positive, and a weak negative and a strong negative impulse. I have shown four relay switches as that number is sufficient for practical working conditions. It is also feasible, although not commercially practicable, to use four main line circuits each having a relay included therein in which case impulses of the same kind or character can be used. It will be understood, therefore, that the use of two main line circuits and four relay switches is merely by way of illustration, the essential factor being that there shall be a sufficient number of switches for commercial purposes.

Referring now more particularly to the type wheel and the controller, the numeral 7 (Figs. 2, 4 and 9) designates a wheel having on the periphery thereof any desired number of letters or other symbols. The hub of this wheel is keyed or otherwise rigidly secured to the upper end of a spindle 8 which extends through a hollow shaft 9, the latter having a bearing in a bracket 9' (Fig. 11) and a yoke 9² forming a part of the frame of the machine. The spindle 8 is capable of longitudinal movement in said shaft so that the wheel may be properly positioned according as to whether the letter on the wheel to be printed is in the upper or lower row. Normally the type wheel is in position to print from the upper row, and to effect the vertical adjustment thereof to print from the lower row the spindle 8 is seated upon a pin 8' passing through an opening in a bracket 9³, and in turn resting upon the free end of an armature lever 8². The latter is held in its retracted position by a spring 8³ surrounding the pin 8' and bearing between the bracket 9' and a collar 9⁴ on the pin 8'. The type wheel is connected to shaft 9 through a pin 10 (Figs. 4 and 9) projecting upwardly from the arm of a collar 10' clamped to said shaft, the pin 10 passing through an opening in one of the spokes 10² of the type wheel. This while effecting the rotation of the type wheel when the shaft 9 is rotated permits the vertical adjustment of said wheel to which reference has been made.

To effect the desired rotation of type wheel 7, when released by the controller as hereafter described, I employ a spring 11 secured at one end to a casing 11' and at the other to shaft 9. This spring is wound by a motor 12 the shaft of which is geared to a counter-shaft 13 (Fig. 11) carrying a pinion 13' which meshes with a gear 13² keyed on spring case 11'. On the counter-shaft 13 is a ratchet wheel 13³ engaged by a back lash pawl 13⁴ to prevent a reverse movement of shaft 9 when the spring is completely wound.

16 designates a carriage (Figs. 2 and 3) capable of movement transversely of the machine at the end of each printing operation as in an ordinary typewriter. On this carriage is mounted a paper reel 16' from which the paper is fed through guide rolls 17 and 17', thence between ribbon 17² and a hammer 18, the printing being effected by the forward movement of said hammer.

In order to release the type wheel from its normal position and to arrest it at a given point, and to effect certain other operations of the machine such as line spacing, carriage return, etc., I employ a controller which is constructed and arranged as follows.

Secured to the base of the frame of the machine is a standard 20 on which is mounted a stationary drum comprising upper and lower plates 21 and 22 respectively, said plates having openings therein adapted to receive pins which serve, when projected upwardly, to limit or determine the ultimate printing position of the type wheel, as well as the intermediate steps in reaching that position, it being remembered that at least three impulses are required to set the printing wheel for any one of the letters or other symbols thereon. These pins, which I will subsequently designate by individual reference numerals, are provided with collars 23, except the stop pin for the normal position of the controller, said collars bearing upon the lower plate 22 of the controller drum. Surrounding said pins and bearing between the upper plate and said collars are springs 24. These springs exert a downward pressure to hold the upper ends of the pins flush with or below the face of the upper plate 21, and to retract the armatures of the selectable magnets when the latter are deënergized.

Secured to shaft 9 is a hub 25 having integral therewith four arms 26, 27, 28 and 29, set ninety degrees apart. These arms are so disposed as to sweep over the face of the upper plate 21 when permitted to rotate, by being released from engagement with any one of the projecting pins, through spring 11 and the connection of the spring case 11' to shaft 9. The arm 26 is longer than any of the others (Fig. 6) and all are held in normal position by said arm resting against a stop pin 30 which rests upon and is held in its projected position by an armature 31 of spring metal secured to a bracket 31', the retracted position of said armature being limited by a suitable stop $31^2$ (see Figs. 3, 4 and 6). The magnet 32 which controls armature 31 is normally deënergized. When energized said armature 31 will be attracted and the stop pin 30 withdrawn to permit the controller arms to rotate until arrested by another one of the pins of the controller which has been set.

As seen by reference to Fig. 6 a certain definite arrangement of the controller pins is observed. The pins 34, 35, 36 and 37 are set ninety degrees apart and determine the four quarters of the circle. Each quarter is divided into three equal thirds by pins designated as follows: in the first quarter 38, 39 and 40; in the second quarter 41, 42 and 43; in the third quarter 44, 45 and 46; in the fourth quarter 47, 48 and 49. The first quarter is further subdivided by three groups of three pins each, one group being in each of the three divisions of that quarter and designated as follows: those of the first subdivision $50^a$, $50^b$ and $50^c$; those of the second subdivision $51^a$, $51^b$ and $51^c$; and those of the third subdivision $52^a$, $52^b$ and $52^c$. The four pins which determine the four quarters, and the twelve pins which determine the divisions of the quarters into thirds are arranged in a circle and so placed as to lie only in the path of the longest arm 26. The three sets of subdivision pins are arranged in the arc of a circle and are so placed as to lie in the path of all the controller arms. Theoretically each third of the remaining quarters is similarly subdivided by three pins each, but by using four arms I am enabled to lessen the number of pins by restricting the ultimate subdivision to the first quarter. As for example, if a given letter or other symbol to be printed is determined by a pin in the second division of the second quarter, that is the division determined by pin 42, the arm 26 on the first impulse will be brought to rest against pin 35 after being released from the stop pin 30, and on the second impulse against pin 42. When that occurs arm 29 will be opposite pin 39, and the third impulse will bring said arm 29 against that one of the group of three pins $51^a$, $51^b$ and $51^c$ corresponding to the particular letter or other symbol, said last-named pin arresting arm 29 and therefore the type wheel the same as if arm 26 should be arrested by a pin in the second division of the second quarter. There is, therefore, no necessity of duplicating the subdivision pins. I will later refer to this when considering the circuits.

It will be seen from the above that the controller pins may be regarded from one point of view as separated into three groups; namely, those which determine the quarter, those which determine the divisions of the quarters; and those which determine the subdivisions of the quarters; it being noted that there are four quarter pins; twelve division pins, three for each quarter; and nine subdivision pins, three in each of the three divisions of the first quarter. These last-named pins answer for all quarters when four arms are used. The quarter pins 34, 35, 36 and 37 will arrest the arm 26 at the particular quarter the pin of which is raised; a division pin will arrest the same arm at the proper division, that is at one of the three divisions of each of the quarters; and a subdivision pin will arrest that one of the four arms which is immediately back of it. I am thus enabled, with a given number of letters or other symbols, to determine the ultimate position of the type wheel by the subdivision pins confined within the first quarter.

Each controller pin rests upon the forward end of an armature of an electromagnet. These magnets are designated by the numeral of the corresponding controller pin with a suitable exponent, in order that they may be readily identified in the circuit diagram. These magnets may be conveniently grouped as illustrated in Fig. 3, the armatures being pivoted on a standard 53 and held in their retracted or normal positions by the springs 24 which surround the controller pins. Stop pins 53' limit the extent of the retracted position of the armatures to such that the upper ends of the controller pins will lie substantially flush with or a little below the plane of the upper side of plate 21.

The armatures of the four quarter magnets (one of them being shown in Fig. 7), are provided with a depending arm 54 so disposed that when a given one of those magnets is energized its armature, through the arm 54, will close a set of three spring contacts or switches included respectively in the circuits of the three division magnets of that quarter, the purpose being that upon the second impulse the current will find a closed circuit through a division magnet. Also when a division magnet is energized, as more fully described hereafter, it closes a contact which upon the third impulse enables the current to flow through a subdivision magnet. The type wheel 7 and the controller arms 26, 27, 28 and 29 rotate in synchronism through the described connections with shaft 9. The controller being divided into quarters, it is necessary that the type wheel shall be similarly divided, that is a certain number of letters or other symbols should be grouped on the type wheel corresponding to the positions of the magnets in the controller. In order to energize the controller magnets in proper sequence to position the type wheel for printing a desired letter, a predetermined code or system of sending in the impulses is essential. In an instrument constructed by me in accordance with the present invention I have used the following:—

| | | | |
|---|---|---|---|
| 1-2-1 letter space | 2-1-2 E | 3-1-2 — | 4-1-2 M |
| 1-2-3 carriage return | 2-1-3 H | 3-1-3 , | 4-1-3 J |
| 1-2-4 line space | 2-1-4 N | 3-1-4 ? | 4-1-4 B |
| 1-3-1 type wheel shift | 2-3-1 W | 3-2-1 Y | 4-2-1 X |
| 1-3-2 type wheel release | 2-3-2 R | 3-2-3 C | 4-2-3 Z |
| 1-3-4 A | 2-3-4 S | 3-2-4 F | 4-2-4 . |
| 1-4-1 I | 2-4-1 T | 3-4-1 G | 4-3-1 K |
| 1-4-2 O | 2-4-2 V | 3-4-2 Q | 4-3-2 P |
| 1-4-3 D | 2-4-3 U | 3-4-3 L | 4-3-4 |

The numerals in the above code or system indicate the sequence of the impulses through the relay contacts 1, 2, 3 and 4. That is, for example, for the letter A the first impulse is through the contact 1, the second impulse through the contact 3, and the third impulse through contact 4. It will be noted that the second impulse over the main line must come through a different contact from that of the first impulse; and that the third impulse must come through a different contact from that of the second and immediately preceding impulse, but may or may not be through the same as the first impulse in the series. In other words, the first impulse may come from the closing of any one of the four relay contacts; the second impulse from any one of the three remaining; and the third from any of the three open contacts which at that time may include that through which the first impulse was sent.

To understand the several circuits and connections for operating the controller reference should be made to the diagram Fig. 1. It will be seen that each line circuit includes a polarized relay electromagnet the armature of which is capable of moving in one direction or the other according to the polarity of the impulse on its line. The armatures of these magnets are connected with one terminal of a local battery 100. The armature $5^2$ coacts with the contacts 1 and 2, and the armature $6^2$ with the contacts 3 and 4, so that whenever a given contact is closed the battery circuit will be continued through the corresponding main circuit 1', 2', 3' or 4' to one of the quarter magnets 34', 35', 36', 37' of the controller. According to the code above given if a letter is in the first quarter the circuit of controller magnet 34' will be closed through contact 1; if in the second quarter the circuit of controller magnet 35' will be closed through contact 2; if in the third quarter the circuit of controller magnet 36' will be closed through contact 3; and if in the fourth quarter the circuit of controller magnet 37' will be closed through contact 4.

Magnet 32 which controls the position of the stop pin 30 is also included in the battery circuit so that when said circuit is closed through any one of the four relay contacts said magnet will be energized and the attraction of its armature will permit stop pin 30 to drop thereby releasing the controller arms. Spring 11 will now act, through the described connections, to rotate the controller arms until arm 26 is arrested by that one of the quarter pins which has been raised or moved into position by the corresponding controller magnet.

When a given quarter magnet is energized the movement of its armature will effect through the arm 54 (see Fig. 7) the closing of a corresponding set of contacts in secondary circuits leading to the three division magnets of that quarter. In Fig. 1 the three contacts 55, 55' and $55^2$ are in the secondary circuits $2^a$, $3^a$ and $4^a$ respectively of the three division magnets of the controller 38', 39' and 40'. The contacts 56, 56' and $56^2$ are in the secondary circuits $1^b$, $3^b$ and $4^b$ respectively of the controller magnets 41', 42' and 43' of the second quarter of the controller. The contacts 57, 57' and $57^2$ are in the secondary circuits $1^c$, $2^c$ and $4^c$ respectively of the magnets 44', 45' and 46' which control the position of the three division pins of the third quarter of the controller. The contacts 58, $58'$ and $58^2$ are in the secondary circuits $1^d$, $2^d$ and $3^d$ of the magnets $47'$, $48'$ and $49'$ which control the position of the three division pins of the fourth quarter of the controller. The circuits $1^b$, $1^c$ and $1^d$ constitute the secondary circuits of the main circuit $1'$; the circuits $2^a$, $2^c$ and $2^d$ constitute the secondary circuits of the main circuit $2'$; the circuits $3^a$, $3^b$ and $3^d$ constitute the secondary circuits of the main circuit $3'$; and the circuits $4^a$, $4^b$ and $4^c$ constitute the secondary circuits of the main circuit $4'$. The contacts in these secondary circuits are merely temporary closures to enable the current to flow through a given division magnet upon the second impulse. It will be noted that the circuit $1^2$ which is branched from circuit $1'$ has no connection to a division magnet in the first quarter of the controller; that the circuit $2^2$ which is branched from circuit $2'$ has no connection to a division magnet in the second quarter; that the circuit $3^2$ which is branched from circuit $3'$ has no connection to a division magnet in the third quarter; and that the circuit $4^2$ which is branched from circuit $4'$ has no connection to a division magnet in the fourth quarter. So that, as above stated, in the sequence of impulses the second and third impulses must be different from the one immediately preceding. If a given impulse is followed by one of the same character, or through the same relay contact it is obvious that the same magnet would be energized and the impulse would be without effect. It will thus be seen that when a given quarter magnet is energized the contacts included in the circuits (those designated for convenience as the secondary circuits) of the three division magnets of that quarter are closed, so that upon the second impulse the battery current will find a closed circuit through the selected division magnet.

Normally all of the circuits of the instrument are open except a weak holding circuit 59 which includes all of the controller magnets. The first impulse, therefore, having released the long controller arm 26 by the withdrawal of stop pin 30, all of the controller arms will be rotated by reason of their connection with shaft 9 until the arm 26 is arrested by contacting with the particular quarter pin which has been raised by its magnet. At the same time, as we have seen, the three contacts in the circuits of the three division magnets of that quarter have been closed, and upon the opening of the relay contact the division contacts are held closed by the holding circuit 59.

The second impulse over the main line circuit may come through any one of the relay contacts not closed by the first impulse. The course of the battery current will be as before through the main circuit closed by the relay contact to the selected quarter magnet, simultaneously closing the three contacts in the secondary circuits of the three divisions of that quarter. This, however, is without effect because the long arm 26 has passed from its normal position and is at rest against the quarter pin raised upon the first impulse. For example, if upon the first impulse the arm 26 is arrested by the quarter pin 36, the setting of any one of the other three quarter pins will not disturb said arm. The effective work of the battery current on the second impulse is, therefore, through the corresponding branch circuit $1^2$, $2^2$, $3^2$ or $4^2$, through relay 61 which is energized thereby, then through the corresponding one of the three division contacts closed by the preceding impulse to the secondary circuit of the division magnet. The latter being energized, its armature will raise or set the corresponding controller pin. The current then flows through the common return wire 60, through magnet 62 which opens the holding circuit 59 thereby opening the three contacts in the three secondary circuits of the division magnets which were closed by the first impulse. This opening of the holding circuit deënergizes the quarter magnet which remained energized by the holding current after the relay contact closed upon the first impulse, was broken. When the quarter magnet is thus deëngerized the corresponding pin drops to its normal position thus freeing controller arm 26 and permitting it to rotate until arrested by the particular division pin set upon the second impulse. The magnet 62 just referred to, which is included in the common return wire, serves to open the holding circuit 59 momentarily when a given relay contact is closed upon the second or third impulse.

The armature $62'$ has pivoted thereon a pawl $62^2$ which normally rests against one of the spring contacts $59'$. When magnet 62 is energized the forward movement of its armature will cause the pawl $62^2$ to separate the contacts $59'$ thereby opening the holding circuit 59. This opening of circuit 59 is only momentary for the reason that as soon as the lower end of pawl $62^2$ contacts with a stop pin $62^3$ said pawl will be tilted so that its upper end will be carried out of engagement with the left-hand side of the engaging contact $59'$, thus again closing circuit 59. When armature $62'$ is retracted the pawl $62^2$ wipes under the contact $59'$ and resumes its normal position.

In addition to the setting of a division pin upon the second impluse it is necessary that certain contacts be closed which will permit the third impulse to set the final or subdivision pin which determines the ultimate or printing position of the type wheel. This is accomplished as follows. When magnet 61 is energized through the closing of the circuit of a given division magnet, as above described, through one of the branch circuits $1^2$, $2^2$, $3^2$ or $4^2$ its armature 61' is attracted thereby closing said magnet 61 on itself through a local circuit 63. This latter circuit can be readily traced from battery 100, circuit $63^5$, coil of magnet 61, to point 63', armature 61', to point $63^2$, through part of the holding circuit 59 to point $63^4$, thence through the armature 64' of a clearing magnet $64^2$, to the return battery wire 101. When the second impulse is broken through the selected relay contact, magnet 61 will remain closed on itself and the division magnet which has been energized to set up the division pin, and the quarter magnet which closed the contacts of the circuits of the division magnets of that quarter remain energized through the holding circuit 59.

Included in the battery circuit is a magnet 65 which is energized at each relay impulse. When deënergized on the breaking of an impulse the armature 65' is retracted closing a local circuit 66 which circuit includes a magnet 67. When magnet 67 is energized its armature 67' (see Fig. 12) which is in the form of a bell crank lever, is attracted to close a spring contact 69. This contact 69 is closed for the purpose of maintaining magnet $67^2$ energized, said magnet being included in the local circuit 68, to thereby maintain closed a series of contacts 70, included in the circuits of the subdivision magnets. These for convenience may be termed the tertiary circuits. The magnets 67 and $67^2$ are in reality two windings, the former being energized through the closing of local circuit 66 by the opening of magnet 65 after magnet 61 has been closed by the second impulse. When contact 69 is closed by magnet 67 said contact is maintained closed by magnet $67^2$ when 67 is deënergized at the time of opening of circuit 66 by the closing of one of the relay contacts by means of magnet 65.

The operations involved in the foregoing series may be briefly restated as follows. The first impulse through any one of the four relay contacts energizes the corresponding quarter magnet of the controller to set a quarter pin, and at the same time withdraws stop pin 30 and closes the three division contacts in the secondary circuits of the selected quarter, or in other words closes a break in one of the secondary circuits in each of the main circuits other than that selected.

The closing of a relay contact upon the second impulse energizes the corresponding quarter magnet to close a break in the secondary circuits of the division magnets of that quarter, but without effect. At the same time the current passes from the second main circuit selected through one of the division contacts of the quarter selected upon the first impulse to the corresponding division magnet. That is, there is a closed circuit through the second selected main circuit and one of the secondary circuits the break in which was closed on the first impulse. Furthermore, the holding circuit 59 is momentarily broken by magnet 62. This breaks the contacts closed by the first impulse and restores the initial quarter magnet pin to normal position. Magnet 61 being at the same time energized closes circuit 63 on itself. Magnet 65 being energized opens circuit 66 controlled thereby.

Upon the breaking of the relay contact which was closed upon the second impulse, circuit 63 remains closed on itself. Circuit 66 which was closed by the opening of the contacts at magnet 65 energizes magnet 67 which remains closed through circuit 68 and contact 69, contacts 70 being closed by the same operation and remaining closed by the current through magnet $67^2$. At this time, that is the opening of a relay contact, the second pin of the series, being one of the division pins, has been raised and the controller arm arrested by it. The division contacts which were closed by the second impulse remain closed through holding circuit 59. The division magnet selected remains energized through the holding circuit thereby holding the corresponding pin in position.

The third impulse must come through a relay contact different from that immediately preceding but it may be the same or different from the contact closed by the first impulse. This operation energizes the corresponding quarter magnet and sets the controller pin of that quarter although this is without effect for the reasons before stated when referring to the second impulse; that is, the long arm of the controller has already been arrested by a division pin. The closing of the division contacts by the third impulse is also without effect because the third is the last impulse of the series. The current, as on the second impulse, passes through that one of the branch circuits $1^2$, $2^2$, $3^2$ or $4^2$ corresponding to the closed relay contact through the corresponding division magnet to set a division pin, but this operation is also without effect inasmuch as the long arm 26 of the controller has been stopped by a division pin on the second impulse and cannot be moved beyond that particular division of the selected quarter. After going through the quarter and division magnets the current passes to the common return wire 60.

From each of the twelve secondary circuits a tertiary circuit leads to a corresponding contact in the group designated respectively 70. As seen by reference to Fig. 1, the circuit $1^b$ has a branch $1^g$ leading to one of the contacts 70 and thence to subdivision magnets 50' and 51'; circuit $3^b$ has a branch $3^g$ leading to one of said contacts and to subdivision magnets $50^2$ and $51^2$; and that circuit $4^b$ as has a branch $4^g$ leading to one of said contacts and to magnets $50^3$ and $51^3$. The circuit $1^c$ has a branch $1^f$ leading to one of said contacts and thence to magnets $51'$ and $52'$; that circuit $2^c$ has a branch $2^f$ leading to one of said contacts and to magnets $51^2$ and $52^2$; that circuit $4^c$ has a branch $4^f$ leading to one of said contacts and thence to magnets $51^3$ and $52^3$. Also that circuit $1^d$ has a branch $1^e$ leading to one of said contacts and to magnet $52'$; that circuit $2^d$ has a branch $2^e$ leading to one of said contacts and to magnet $52^2$; and that circuit $3^d$ has a branch $3^e$ leading to one of said contacts and to magnet $52^3$. Also that circuit $2^a$ has a branch $2^h$ leading to one of said contacts and to magnet $50'$; that circuit $3^a$ has a branch $3^h$ leading to one of said contacts and to magnet $50^2$; and that circuit $4^a$ has a branch leading to one of said contacts and to magnet $50^3$. By tracing these circuits it will be seen that each magnet controlling a subdivision pin of the controller is in two of these tertiary circuits; that is, magnet $50'$ is in the circuits $1^g$ and $2^h$; magnet $50^2$ in the circuits $3^g$ and $3^h$; magnet $50^3$ in the circuits $4^g$ and $4^h$; magnet $51'$ in circuits $1^f$ and $1^g$; magnet $51^2$ in circuits $2^f$ and $3^g$; magnet $51^3$ in circuits $4^f$ and $4^g$; magnet $52'$ in circuits $1^f$ and $1^e$; magnet $52^2$ in circuits $2^f$ and $2^e$, and magnet $52^3$ in circuits $4^f$ and $3^e$. By so arranging the circuits I am enabled to control the nine magnets which in turn control the nine subdivision pins of the controller through the twelve tertiary circuits. The current from a given division circuit upon the third impulse finds a path through a tertiary circuit to the corresponding subdivision contact at 70, thence to the selected subdivision magnet to the common return wire 60; thence through the tripping magnet 62 which deënergizes the quarter magnets and the division magnets set by the previous impulse, restoring their pins to normal position and releasing arm 26 thus permitting the arms to rotate until brought to rest by that one of the arms which is immediately back of the subdivision pin which has been set by the last impulse. This final movement of the arm brings the type wheel 7 to printing position. When the relay contact is broken at the third impulse the only circuit through the selected subdivision magnet is the holding circuit.

The several operations above given in detail may be readily understood by following the circuits for a given letter. For example, the letter A will be set up in printing position by impulses through the relay contacts in the order 1—3—4. The several positions of the controller arms are illustrated in Fig. 6. The first impulse being through relay contact 1, the stop pin 30 is withdrawn when its magnet 32 is energized. The code adopted for the letter A signifies that it is in the first quarter of the controller. By tracing the circuits it will be seen that magnet $34'$ will be energized thereby raising pin 34 against which the arm 26 will come to rest. At the same time the contacts 55, $55'$, $55^2$ will be closed by the movement of arm 54 depending from the armature of magnet $34'$. The second impulse will be through relay contact 3. The current now flows through circuit $3^2$, magnet 61, contact $55'$, branch $3^a$, and magnet $39'$ which sets pin 39. At the same time trip magnet 62 which is included in the common return wire 60 is energized to momentarily break the holding circuit. This will break the secondary circuits through contacts 55, $55'$, and $55^2$ and also deenergizes magnet $34'$ which permits quarter pin 34 to resume its normal position, and the type wheel to rotate until arrested by arm 26 engaging pin 39. The restoration of the holding circuit through contacts $59'$ maintains the division pin 39 in position. On the breaking of the second impulse the contacts at 70, which close the circuits of the subdivision magnets, remain closed as already explained. The third impulse closes relay contact 4 and by tracing the circuits the current passes through circuit $4^2$, the coil of magnet 61, through contact $57^2$, through the tertiary circuit $4^f$ to the corresponding contact 70 included in the circuit of magnet $51^3$. The division pin 39 having been withdrawn upon the making of the third impulse by the momentary interruption of the holding circuit, and subdivision pin $51^c$ now having been raised, the controller arm 26 which is the first one immediately back of said raised pin, will be brought to rest, thus determining the ultimate or printing position of the type wheel for the selected letter. The letter K, for example, is in the fourth quarter of the controller. To position the type wheel for printing this letter the first impulse is through relay contact 4. This will energize magnet $37'$ of the controller to set pin 37, and simultaneously close the contacts 58, $58'$ and $58^2$, and withdraw stop pin 30. The controller arms will rotate through two hundred seventy degrees until brought to rest by arm 26 engaging pin 37. The second impulse is through relay contact 3. Circuit $3^2$ being closed through contact $58^2$, magnet $49'$ will be energized through secondary circuit $3^d$ thereby setting pin 49 against which the controller arm 26 will come to rest immediately upon the restoration of pin 37 to normal position. The third impulse is through relay contact 1. Circuit $1^2$ being closed through contact 57, the current will flow through tertiary circuit $1^f$, which is branched from the secondary circuit $1^c$, to the corresponding contact 70, to magnet $52'$ thereby raising pin $52^a$ against which arm 27 will come to rest upon the restoration of pin 49 to normal position.

The principle underlying the arrangement of the subdivision pins and the corresponding controller magnets may be readily understood by assuming a theoretical condition of thirty-six subdivision magnets divided into twelve groups of three, each group of three representing one division of the controller. There then being nine subdivision magnets in each quarter of the controller the thirty-six magnets so far as concerns their arrangement relatively to the controller may be considered as divided into nine groups of four each. That is, for each quarter of the controller there is a magnet and corresponding pin occupying the same relative positions in the quarters and, therefore, ninety degrees apart. By using four arms 26, 27, 28 and 29 I am able to operate the machine by employing only nine subdivision magnets. This materially decreases the size of the machine as it dispenses with twenty-seven magnets. The ultimate position of rest of the controller arms being determined by one of the subdivision pins, it will be noted that for the first quarter the arm 26 only is called into play; for the second quarter arms 26 and 29, the former to determine the quarter and division and the latter a subdivision; for the third quarter arms 26 and 28; and for the fourth quarter arms 26 and 27.

I have in the foregoing description designated the circuit over which the first impulse is caused to act as the main circuit; that over which the second impulse is caused to act as the secondary circuit; and that over which the third impulse is caused to act as the tertiary circuit, and it will be understood that the essential characteristic of my invention is the relation between the several circuits whereby the closing of a selected main circuit will energize one of the controller magnets and at the same time close a break in a plurality of circuits one of which circuits is completely closed on the next succeeding impulse, a given sequence of three impulses at the least being required to determine the printing position of any letter, the printing being effected on the breaking of the third impulse.

*Printing.*—The type wheel having now been brought to its printing position, the printing is effected by the forward movement of hammer 18 against the paper. This hammer is actuated as follows. Included in the printing circuit 75 is a magnet 75'. This magnet is supported in a suitable bracket forming a part of the frame of the machine as indicated in Fig. 4. The armature $75^2$ of said magnet is fixed on rock shaft 76 which has bearings in a suitable yoke 76'. Supported in the frame of the machine is a long tubular bearing 77 through which passes a plunger 77'. The plunger 77' is surrounded for a portion of its length within the tubular bearing by a spring $77^2$ which bears against a shoulder on said plunger and the base of an enlarged opening in the bearing and acts normally to hold the armature $75^2$ retracted. When the third impulse is broken magnet 75' will be energized and the plunger 77' and hammer 18 moved forward, and by impinging against the paper effect the printing of the desired letter or other symbol. The printing magnet 75' and other working magnets to be presently described are included in circuits controlled by a commutator which will be more specifically described after a statement of the mechanical operations involved.

*Letter and word spacing.*—As before described, the paper roll 16' is mounted on a carriage 16. Constituting a part of this carriage is a transverse rod $16^2$ which moves between pairs of guide rolls $16^3$ placed on each side of the frame of the machine. Extending transversely of the machine and forming part of the paper carriage is a rack 78 engaged by a gear wheel 78' loose on a vertical shaft $78^2$ (see Figs. 2, 4 and 10). This shaft carries a hollow hub 79 to receive the reduced upper end of a shaft 79' on which is splined a ratchet wheel 80. Secured to the under side of gear wheel 78' is a crown gear 81 meshing with a similar gear 81', the latter being keyed on ratchet shaft 79' and the former being loose on shaft $78^2$. Ratchet 80 is provided with two vertically set pins 80', which enter openings in the lower crown gear 81'. Within the crown gear 81 is a coil spring 82 fast at one end to said gear and at the other to shaft $78^2$.

The ratchet 80 is engaged by spring pressed pawl 83 carried by a lever 83' passing between guide rolls $83^2$, and connected to the upper end of an armature 84 pivoted on a rock shaft 84' beneath the bed-plate of the machine (Figs. 4 and 5). The magnet 85 is in series with the printing magnet 75' and when energized the attraction of its armature feeds the pawl 83 over the teeth of ratchet 80. Upon the completion of the printing operation magnet 85 will be deenergized, when a spring 86 secured to pawl lever 83' and to the frame of the machine, will draw said lever backward so as to feed ratchet wheel 80. By reason of the described connections the gear 78' will be rotated thereby feeding the carriage the distance of the throw of the ratchet wheel. The spring 82 is so connected that when the ratchet wheel is fed to space the carriage said spring will be wound, and when the carriage is released at the end of a line the spring by unwinding will return the carriage to its initial position. For word spacing the operations are the same except that printing magnet 75' is not energized when pawl 83 rides over the teeth of ratchet 80, a back latch pawl 80² preventing a reverse movement of the ratchet.

*Carriage release.*—As seen by reference to Fig. 4 a spring 87 surrounds the ratchet shaft 79' and bears between the ratchet and the lower crown gear 81'. This spring acts normally to hold the two crown gears in mesh with each other. The lower end of ratchet shaft 79' is engaged by the forked arm of a pivoted armature 88. When magnet 89 is energized the attraction of its armature 88 draws shaft 79' downward and with it the lower crown gear 81'. This separates the crown gears and permits spring 82 to unwind thus rotating gear 78' and restoring the carriage to its initial position. When magnet 89 is deënergized spring 87 acts to restore lower crown gear 81' to normal position, that is in mesh with the upper crown gear.

*Line space.*—Supported upon the bed-plate of the machine is a magnet 90 which when energized effects the line spacing of the paper. The armature 90' of said magnet is in the form of a bell crank lever which at its free end is connected to a rod 90² the forward end of which is in the form of a yoke adapted to engage the upper end of a lever 91. This lever is pivoted on the carriage frame and carries a spring pressed pawl 91' which engages the teeth of a ratchet wheel 91³ fast to the end of guide roll 17, or fast to the shaft of said roll. When magnet 90 is energized lever 91 is thrown to the right carrying with it pawl 91' to thereby feed the roll 17' and thereby the paper a predetermined distance depending upon the adjustment of the several parts. When magnet 90 is deënergized a spring 91² secured to the frame and to lever 91 restores the latter and thereby pawl 91' to normal position.

*Type wheel shift.*—In the drawings I have shown a type wheel having the letters or other symbols there arranged in two rows. Normally the type wheel 7 is in position to print from the upper row. When, however, it is necessary to print from the lower row said wheel must be adjusted or shifted vertically. As before described the spindle 8 of the type wheel rests upon a pin 8', the latter in turn resting upon the free end of an armature lever 8². In order to raise type wheel 7 I employ a magnet 92 secured to a bracket beneath the bed-plate of the machine. When said magnet is energized the attraction of its armature 8² will raise type wheel 7, as will be readily understood by reference to Fig. 4.

In order that the type wheel 7 may not be raised above proper printing position I attach a guard 93 (Figs. 2 and 4) to a bracket on the frame of the machine. The armature lever 8² is constructed as seen in Fig. 5 with a laterally projecting arm 8⁴ which normally rests against an armature 94' of a magnet 94. Armature 94' is held in its retracted position by a spring 94². When magnet 92 is energized the arm 8⁴ of its armature lever will be drawn into such position as to release armature 94' when the latter will be retracted still further so that the arm 8⁴ will be locked in its attracted position by a detent 94³ on armature 94'.

To restore type wheel 7 so that it will print in its normal position, that is from the upper row of letters, after magnet 92 has been deënergized, I energize magnet 94. When armature 94' is thus attracted the spring 8³ acting downwardly against the free end of armature 8² will permit the type wheel to drop to normal position.

*Ribbon feed.*—The ribbon 17² passes around guide rolls 17³ (Fig. 9) which maintain it in proper relation to the type wheel and the paper. This ribbon is wound between the two reels 95 and 95'. The latter is mounted upon a shaft 95² supported in suitable bearings in the frame of the machine. At its lower end this shaft has keyed thereto a worm wheel 95³ which meshes with a worm 96. On the shaft of the latter is keyed a ratchet wheel 96' engaged by a pawl 96² (see Figs. 2 and 4) carried by a link 96³ pivoted on the side of the pawl lever 83'. It will thus be seen that at each rearward movement of lever 83' to effect the feed of the carriage at the end of each printing operation the ribbon will be advanced so as to present a fresh surface for the next printing operation.

By reference to the code or system which I have used in operating the present machine it will be seen that to effect the operations of letter spacing, carriage release, line spacing, type wheel shift and return, a certain sequence of impulses must be sent over the line circuit to energize the line relays the same as when setting the type wheel for printing position.

In order that the circuit may be completed through a given working magnet as described I employ a commutator ring supported as shown in Fig. 4 on the standard 20 within the controller drum. This commutator is divided as shown in Figs. 1 and 7 by suitable insulation, the inner ring 97 of conductive material being continuous throughout, and the outer ring 98 being divided into the requisite number of sections. The inner leg 97' of the brush rests upon the continuous ring 97 and the outer leg 98' rests upon the divided ring. The brush is secured to one of the controller arms as 27, the relation of the brush to the two commutator rings being such that when the long arm 26 is at normal position against pin 30, or against one of the four quarter pins, or any one of the twelve division pins the circuits of the working magnets 75', 85, 89, 90, 92 and 94 will be broken. It will be noted that the code or system of impulses employed will move the brush to such position as to bridge the proper space to energize a given or selected working magnet.

The clearing magnet $64^2$ is in series with the working magnets, and is, therefore, energized when any one of said working magnets is energized. This opens the holding circuit 59 and restores all parts to normal position. Any controller pin that has been set for positioning the type wheel will resume its normal position; and spring 11 rotates the controller arms until arm 26 is arrested by pin 30 which has been raised by the breaking of the third impulse. The parts are now in position to be again operated for the printing of the next letter or other symbol.

Included in the holding circuit 59 is an electromagnet 99 the armature of which is included in the printing circuit 75. Said circuit should be closed at the breaking of the third impulse in order to effect the printing operation. At that time magnet 99 is energized by the holding circuit thus closing the break at that point. At the opening of the third impulse magnet 32 is deënergized thus closing the break in the printing circuit at that point, and since the controller brush is on a metallic segment the printing circuit will be completely closed. When the holding circuit 59 is open to restore the parts to normal position after the printing, magnet 99 is deënergized and breaks the printing circuit 75 through the commutator, thus preventing sparking at the commutator.

Assuming all the letters of a line of writing to be on the upper row of the type wheel the only operations involved are those of printing and letter or word spacing. At the end of the line the magnet 89 is energized to restore the carriage to its initial position, and the spacing magnet 90 is energized to shift the paper. When the type wheel is to be vertically adjusted magnets 92 and 94 are respectively energized.

In the foregoing specification while I have made reference to two main line circuits it is to be understood that such reference is merely for the purpose of illustration. As before stated, I may use a single line circuit having included therein four relays responsive to different kinds or characters of impulses. The present invention may be used in connection with any suitable transmitting instrument capable of sending the proper impulses over the line in proper sequence.

What I claim and desire to secure by Letters Patent is:—

1. A telegraph typewriter comprising a plurality of main circuits, a plurality of secondary circuits branching from each main circuit, a tertiary circuit branching from each secondary circuit, all of said circuits being normally open, means for closing a selected main circuit and at the same time closing a break in at least one of the secondary circuits of each of the other main circuits, means for completely closing a selected secondary circuit and at the same time a break in the tertiary circuits, and means for completely closing a selected tertiary circuit.

2. A telegraph typewriter comprising a plurality of main circuits, a plurality of secondary circuits branching from each main circuit, a tertiary circuit branching from each secondary circuit, all of said circuits being normally open, selectable magnets each responding to a characteristic kind of impulse and adapted to close a corresponding main circuit, means for closing a break in at least one of the secondary circuits of each of the main circuits except the selected main circuit closed by the first impulse, and means for closing a break in at least one of the secondary circuits of each of the main circuits except the selected main circuit closed by the second impulse and for closing at the same time a break in the tertiary circuits, the closing of the third selected main circuit completely closing a given tertiary circuit.

3. A telegraph typewriter comprising a plurality of main circuits, a plurality of secondary circuits branching from each main circuit, a tertiary circuit branching from each secondary circuit, all of said circuits being normally open, means for closing a selected main circuit and at the same time a break in a plurality of secondary circuits; means for completely closing a selected secondary circuit and at the same time a break in a plurality of tertiary circuits, and means for completely closing a tertiary circuit.

4. A telegraph typewriter comprising a plurality of main circuits, a plurality of secondary circuits branching from each main circuit, a tertiary circuit branching from each secondary circuit, all of said circuits being normally open, selectable magnets responsive to a characteristic kind of impulse and adapted to close a corresponding main circuit, the breaks in the secondary circuits being grouped so that the closing of a selected main circuit will effect the closing of a break in at least one of the secondary circuits of each of the other main circuits, and means for closing a break in said tertiary circuits when a given set of secondary circuits is closed, the operation of two selectable magnets being required to close the breaks in the tertiary circuits.

5. A telegraph typewriter comprising a plurality of main circuits, a plurality of secondary circuits branching from each main circuit, said circuits being normally open and the breaks in the secondary circuits being grouped so that the closing of a selected main circuit will effect the closing of a break-in at least one of the secondary circuits of each of the other main circuits, selectable magnets responsive to a characteristic kind of impulse and adapted to close a corresponding main circuit, and means for opening the secondary circuits closed by the first impulse upon the coming in of the second impulse.

6. A telegraph typewriter comprising a plurality of main circuits, a plurality of secondary circuits branching from each main circuit, a tertiary circuit branching from each secondary circuit, all of said circuits being normally open and the breaks in the secondary circuits grouped so that the closing of a selected main circuit will effect the closing of a break in at least one of the secondary circuits of each of the other main circuits, selectable magnets responsive to a characteristic kind of impulse adapted to close a corresponding main circuit, means for closing a break in said tertiary circuits when a given set of secondary circuits is closed, and means for opening the secondary circuits closed by a given impulse upon the sending in of the next succeeding impulse.

7. A telegraph typewriter comprising a plurality of main circuits, a plurality of secondary circuits branching from each main circuit, a tertiary circuit branching from each secondary circuit, all of said circuits being normally open, selectable magnets responsive to a characteristic kind of impulse and adapted to close a corresponding main circuit, means to effect, upon the closing of a selected main circuit and by the same operation, the closing of a break in at least one of the secondary circuits of each of the other main circuits upon the sending in of a given impulse, and means for closing a break in the tertiary circuits, and for opening the secondary circuits closed by a given impulse, upon the sending in of the next succeeding impulse.

8. A telegraph typewriter comprising a plurality of main circuits, a plurality of secondary circuits branching from each main circuit, a tertiary circuit branching from each secondary circuit, all of said circuits being normally open, and means for closing said circuits selectively by first closing a given main circuit and a break in at least one of the secondary circuits of each of the other main circuits, then opening said selected main circuit and maintaining the breaks in the secondary circuits closed, then closing another main circuit and a break in at least one of the secondary circuits of each of the main circuits except those of the selected main circuit, and by the same operation opening the secondary circuits closed by the first operation, and closing a break in said tertiary circuits.

9. A telegraph typewriter comprising a plurality of main circuits, a plurality of secondary circuits branching from each main circuit, a tertiary circuit branching from each secondary circuit, all of said circuits being normally open, selectable magnet responsive to a characteristic kind of impulse and adapted to close a corresponding main circuit, the first one of a given sequence of impulses closing the corresponding main circuit and a break in at least one of the secondary circuits of each of the other main circuits, means for maintaining said breaks in the secondary circuits closed upon the opening of the selected main circuit, means adapted upon the sending in of the second impulses closing the corresponding main for closing a break in at least one of the secondary circuits of each of the main circuits except those of the second selected circuit and for opening the secondary circuits closed by the first operation and for closing a break in the tertiary circuits, and means for opening the set of secondary circuits closed by the second impulse upon the sending in of the third impulse.

10. A telegraph typewriter comprising a plurality of main circuits, a plurality of secondary circuits branching from each main circuit, a tertiary circuit branching from each secondary circuit, all of said circuits being normally open and each including a magnet, means for closing a given main circuit to energize the magnet included therein the operation of said magnet closing breaks in at least one of the secondary circuits of each of the other main circuits, means for closing a second main circuit to energize a magnet included in one of the secondary circuits the break in which was closed by the closing of the first-named main circuit and by the same operation to close a break in the tertiary circuits, and means for closing a third main circuit to thereby energize a magnet included in one of the tertiary circuits the break in which was closed by the closing of the second-named circuit, the closing of the main circuits in a certain order of three at the least closing respectively a main, a secondary and a tertiary circuit.

11. A telegraph typewriter comprising normally open main, secondary and tertiary circuits, means for closing a selected main circuit and at the same time breaks in a plurality of secondary circuits, means for completely closing a selected secondary circuit through another main circuit and at the same time breaks in a plurality of tertiary circuits, and means for completely closing a selected tertiary circuit through a third selected main circuit.

12. A telegraph typewriter comprising normally open main, secondary and tertiary circuits, means for closing a selected main circuit and at the same time a break in at least one of the secondary circuits of each of the other main circuits, means for completely closing one of said last-named secondary circuits through another main circuit and at the same time a break in at least one of the secondary circuits of each of the main circuits other than that closed when the selected secondary circuit is closed, and means for completely closing a selected tertiary circuit through a third selected main circuit.

13. In a telegraph typewriter the combination of a type wheel, a controller comprising electromagnets to determine the position of said wheel, normally open circuits in which said magnets are included, means for energizing a set of said magnets in a predetermined sequence for any given letter or other symbol, and means, when a given circuit is closed, for closing breaks in a plurality of circuits one of which circuits includes the next succeeding magnet to be operated.

14. In a telegraph typewriter the combination of a type wheel, a series of electromagnets to determine the position of said wheel, normally open circuits in which said magnets are included, means for energizing a set of at least three of said magnets in a predetermined sequence for any given letter or other symbol by three successive impulses, and means for closing a break in the circuits of the second and third magnets to be energized upon the sending in of the first and second impulses respectively.

15. In a telegraph typewriter the combination of a type wheel, a series of electromagnets to determine the position of said wheel, normally open circuits in which said magnets are included, means for energizing a set of said magnets in a predetermined sequence for a given letter or other symbol by successive impulses, means for closing a break in a plurality of circuits when the first of said magnets is energized one of which circuits includes the next succeeding magnet to be operated, and means for closing a break in a plurality of circuits when the second magnet is energized one of which last-named circuits includes the third magnet to be operated.

16. In a telegraph typewriter the combination of a type wheel, electromagnets to control the position of said wheel, normally open circuits in which said magnets are included, means for energizing a series of said magnets in a pre-determined sequence by successive impulses, each impulse completely closing the circuit of a given magnet and also breaks in a plurality of circuits one of which latter circuits is completely closed selectively on the coming in of the next succeeding impulse.

17. In a telegraph typewriter the combination of a type wheel, electromagnets to control the position of said wheel, normally open circuits in which said magnets are included, means for closing a given circuit thereby energizing one of said magnets and at the same time closing breaks in a plurality of other circuits, means for completely closing the circuit of a second magnet through one of the circuits a break in which was closed when the first magnet was energized and at the same time closing breaks in a third set of circuits, and means for completely closing one of said last-named circuits and thereby energizing a third controller magnet.

18. In a telegraph typewriter the combination of a type wheel, a plurality of main circuits, a plurality of secondary circuits branching from each main circuit, a tertiary circuit branching from each secondary circuit, said circuits being normally open, a magnet included in each of said circuits to determine a given position of said wheel, means for energizing a series of said magnets in a predetermined sequence, and means for rotating the type wheel when each of the selected magnets is energized.

19. In a telegraph typewriter the combination of a type wheel, a plurality of main circuits, a plurality of secondary circuits branching from each main circuit, a tertiary circuit branching from each secondary circuit, said circuits being normally open, a magnet included in each of said circuits to determine a given position of said wheel, means for closing a selected main circuit to energize a corresponding magnet and by the same operation to close a break in at least one of the secondary circuits of each of the other main circuits, means for closing a selected secondary circuit to energize a corresponding magnet and by the same operation to close a break in the tertiary circuits, means for completely closing a selected tertiary circuit to energize a corresponding magnet, and means for rotating the type wheel when each of the selected magnets is energized.

20. In a telegraph typewriter the combination of a type wheel, a plurality of main circuits, a plurality of secondary circuits branching from each main circuit, a tertiary circuit branching from each secondary circuit, said circuits being normally open, a magnet included in each of said circuits to determine a given position of said wheel, selectable magnets each responding to a characteristic kind of impulse and adapted to close a corresponding main circuit, means for closing a break in at least one of the secondary circuits of each of the main circuits other than the selected main circuit on the coming in of the first impulse, means for closing at least one of the secondary circuits of the main circuits other than the selected main circuit on the second impulse and for closing a break in the tertiary circuits, the closing of the third selected main circuit completely closing a given tertiary circuit and the closing of the respective circuits in the order named energizing at least three of the controller magnets, and means for rotating the type wheel when each of the controller magnets is energized.

21. In a telegraph typewriter the combination of a type wheel, normally open main, secondary and tertiary circuits, electromagnets included in said circuits and adapted to control the position of said wheel, means for closing a selected main circuit to energize a given magnet and at the same time to close a break in a plurality of secondary circuits, means for completely closing a selected secondary circuit through another main circuit to energize a magnet included in the selected secondary circuit and at the same time to close breaks in a plurality of tertiary circuits, and means for completely closing a selected tertiary circuit through a third selected main circuit to energize a magnet included in the selected tertiary circuit.

22. In a telegraph typewriter the combination of a type wheel, a controller comprising a plurality of magnets to determine successive positions of said wheel, normally open circuits in which said magnets are included, selectable magnets each responding to a characteristic kind of impulse and adapted to close said circuits, the operation of said selectable magnets in a certain order of three at the least closing the circuits of a corresponding number of controller magnets, and means for rotating said wheel when each of said controller magnets is energized.

23. In a telegraph typewriter the combination of a type wheel, normally open main, secondary and tertiary circuits, electromagnets included in said circuits and adapted to control the position of said wheel, means for closing a selected main circuit to energize a given magnet and at the same time to close a break in at least three of said secondary circuits, means for completely closing one of said last-named secondary circuits through another main circuit to energize a magnet included in the selected secondary circuit and at the same time to close breaks in at least three of said tertiary circuits, and means for completely closing one of said last-named tertiary circuits through another main circuit to energize a magnet included in the selected tertiary circuit.

24. In a telegraph typewriter the combination of a type wheel, a controller comprising a plurality of magnets divided into groups to determine the position of said wheel in a given quarter, division and subdivision of that quarter, main circuits in which the quarter magnets are included, secondary circuits in which the division magnets are included, tertiary circuits in which the subdivision magnets are included, all of said circuits being normally open, selectable magnets each responding to a characteristic kind of impulse and adapted to close said circuits, the operation of said selectable magnets in a certain order of three at the least closing successively the circuits of at least three of the controller magnets one in each group, and means for rotating said wheel when each selected controller magnet is energized.

25. In a telegraph typewriter the combination of a type wheel, a controller comprising a plurality of magnets, said magnets being divided into groups to determine the position of said wheel in a given quarter, division and subdivision of that quarter, main circuits in which the quarter magnets are included, secondary circuits in which the division magnets are included, tertiary circuits in which the subdivision magnets are included, means for closing said circuits and energizing a selected series of said magnets in a predetermined sequence for a given letter or other symbol said series comprising at least one in each group of magnets in the order named, and means for rotating said wheel when each magnet of the selected series is energized.

26. In a telegraph typewriter the combination of a type wheel, a controller comprising a plurality of magnets to determine the position of said wheel, said magnets being divided into groups included in main, secondary and tertiary circuits, the complete circuit of a magnet in a main circuit having at least one break, the complete circuit of a magnet in a secondary circuit having at least two breaks, and the complete circuit of a magnet in a tertiary circuit having at least three breaks, means for completely closing successively a selected main, secondary and tertiary circuit to thereby energize a corresponding controller magnet, and means for rotating said wheel when each magnet of the particular series selected is energized.

27. In a telegraph typewriter the combination of a type wheel, a controller comprising a plurality of magnets to determine successive positions of said wheel, main circuits in which are included the magnets which determine the first position of said wheel, secondary circuits branching from said main circuits and in which are included the magnets which determine the second position of said wheel, a tertiary circuit branching from each secondary circuit in which are included the magnets which determine the printing position of said wheel, selectable magnets each responding to a characteristic kind of impulse and adapted to close said main circuits, means for closing a break in at least one of the secondary circuits of each of the main circuits except those of the selected main circuit upon the first impulse of the series, and means for closing a break in the tertiary circuits upon the second impulse of the series, the operation of three at least of the controller magnets determining the printing position of the type wheel.

28. In a telegraph typewriter the combination of a type wheel, a series of electromagnets to determine the position of said wheel, normally open circuits in which said magnets are included, means for energizing a set of said magnets in a predetermined sequence for a given letter or other symbol by successive impulses, means for moving said wheel to its printing position, means for holding said wheel in printing position, and means to effect the printing operation upon the breaking of the last impulse.

29. In a telegraph typewriter the combination of a type wheel, a series of electromagnets to determine the position of said wheel, normally open circuits in which said magnets are included, means for energizing a set of said magnets in a predetermined sequence for a given letter or other symbol by successive impulses, means for rotating said wheel when released, a holding circuit for maintaining said wheel in printing position, means to effect the printing operation upon the breaking of the last impulse, and means for clearing the holding circuit and to restore the parts to normal positions.

30. In a telegraph typewriter the combination of a type wheel, a controller comprising a plurality of magnets divided into three groups to determine successive positions of said wheel, normally open circuits in which said magnets are included, adjustable pins corresponding in number to the controller magnets and adapted when set by the magnets to arrest the type wheel in a given position, selectable magnets each responding to a characteristic kind of impulse and adapted to close said circuits, the operation of said selectable magnets in a certain order of three at the least closing the circuits of a corresponding number of controller magnets to position the pin controlled thereby to arrest the type wheel, and means for rotating said wheel upon the coming in of each impulse.

31. In a telegraph typewriter the combination of a type wheel, a controller therefor, said controller comprising a series of adjustable pins arranged in quarter, division and subdivision groups, a series of magnets adapted to move said pins into working position, normally open circuits in which said magnets are included, selectable magnets responsive to a characteristic kind of impulse and adapted to close said circuits, and means whereby when the impulses are sent in in a predetermined sequence for any given letter or other symbol controller magnets corresponding to a quarter, division and subdivision pin will be successively energized, and means for rotating the type wheel at each impulse.

32. A telegraph typewriter comprising a plurality of main circuits, a plurality of secondary circuits branching from each main circuit, a tertiary circuit branching from each secondary circuit, selectable magnets each responding to a characteristic kind of impulse and adapted to close the main circuits, a magnet included in all of said main circuits and energized at each impulse, a magnet included in branches of the main circuits and energized upon the closing of any one of the secondary circuits, a local circuit controlled by said magnets, and a magnet included in said local circuit and adapted when energized to close a break in the tertiary circuits.

33. A telegraph typewriter comprising a plurality of main circuits, a plurality of secondary circuits branching from each main circuit, a tertiary circuit branching from each secondary circuit, means for closing said main circuits responsive to a characteristic kind of impulse, a magnet included in all of said main circuits and energized at each impulse, a magnet included in branches of the main circuit and energized upon the closing of any one of the secondary circuits, a local circuit controlled by said magnets so as to be closed when said first-named magnet is deënergized and said second-named magnet energized, and a magnet included in said local circuit and adapted when energized to close a break in the tertiary circuits.

34. A telegraph typewriter comprising a plurality of main circuits, a plurality of secondary circuits branching from each main circuit, a tertiary circuit branching from each secondary circuit, means for closing said main circuits responsive to a characteristic kind of impulse, a magnet included in all of said main circuits and energized at each impulse, a magnet included in branches of the main circuit and energized upon the closing of any one of the secondary circuits, a local circuit controlled by said magnets so as to be closed when said first-named magnet is deënergized and said second-named magnet energized, a magnet included in said local circuit and adapted when energized to close a break in the tertiary circuits, and means for holding the local circuit closed when said first-named magnet is energized.

35. In a telegraph typewriter the combination of a type wheel, a controller to determine the position of said wheel said controller comprising a plurality of magnets, means for energizing a series of said magnets in a predetermined sequence for a given letter or other symbol, means controlled by said magnets to release and arrest said wheel, means to rotate said wheel when released, and means for maintaining a given controller magnet energized until the next succeeding magnet of the series is energized.

36. In a telegraph typewriter the combination of a type wheel, a controller to determine the position of said wheel said controller comprising a plurality of magnets, an auxiliary holding circuit for said magnets, means for energizing a series of said magnets in a predetermined sequence for a given letter or other symbol, means controlled by said magnets to release and arrest said wheel, means to rotate said wheel when released, and means for momentarily opening the holding circuit to fully deënergize a given magnet after the succeeding magnet of the series has been fully energized.

37. A telegraph typewriter comprising a plurality of normally open main, secondary and tertiary circuits, a magnet included in each circuit, means for closing a selected main circuit to thereby energize the magnet included therein and to close a break in a series of secondary circuits, means for closing a second selected main circuit to thereby energize a magnet included in one of said series of secondary circuits and to close a break in a second series of secondary circuits and a break in a series of tertiary circuits, and means for closing a third selected main circuit to thereby energize a magnet included in one of the series of tertiary circuits.

38. In a telegraph typewriter the combination of a type wheel, a series of magnets to control the position of said wheel, a plurality of main circuits, a plurality of secondary circuits branching from each main circuit, a tertiary circuit branching from each secondary circuit, said circuits being normally open and each including a magnet, means for closing a selected main circuit to thereby energize the magnet included therein and to close a break in a series of secondary circuits, means for closing a second selected main circuit to thereby energize a magnet included in one of said series of secondary circuits and to close a break in a second series of secondary circuits and a break in a series of tertiary circuits, means for closing a third selected main circuit to thereby energize a magnet included in one of the said series of tertiary circuits, and means for rotating said wheel when each of said magnets is energized.

39. In a telegraph typewriter the combination of a type wheel, a controller comprising electromagnets to determine the position of said wheel, normally open circuits in which said magnets are included, means for energizing a set of said magnets in a pre-determined sequence for any given letter or other symbol by at least three successive impulses, means for closing the circuit of the first of said set of magnets on the first impulse and at the same time breaks in a plurality of circuits one of which latter circuits is utilized on the coming in of the second impulse, means for closing the circuit of the second of said set of magnets on the second impulse and at the same time breaks in a plurality of circuits one of which latter circuits is utilized on the coming in of the third impulse, and means for energizing the third of said set of magnets on the coming in of the third impulse.

40. In a telegraph typewriter the combination of a type wheel, normally open main, secondary and tertiary circuits, electromagnets included in said circuits and adapted to control the position of said wheel, selectable magnets each responding to a characteristic kind of impulse and adapted to close a corresponding main circuit, means for closing a break in at least one of the secondary circuits of each of the main circuits other than that closed on the coming in of the first impulse, means for completely closing one of said last-named secondary circuits through another main circuit on the coming in of the second impulse and at the same time closing a break in at least one of the secondary circuits of each of the main circuits other than that closed on the second impulse, the coming in of the third impulse completely closing a selected tertiary circuit and the closing of the respective circuits in the order named energizing at least three of the controller magnets.

41. In a telegraph typewriter the combination of a type wheel, normally open main, secondary and tertiary circuits, a controller comprising electromagnets included in said circuits and adapted to determine the position of said wheel, selectable magnets each responding to a characteristic kind of impulse and adapted to close a corresponding main circuit, and means for closing breaks in a plurality of secondary and tertiary circuits on the coming in of the first and second impulses respectively, one of said secondary circuits being completely closed through a selected main circuit on the coming in of the second impulse and one of said tertiary circuits being completely closed through a selected main circuit on the coming in of the third impulse, the closing of a selected main, secondary and tertiary circuit in the order named energizing at least three of the controller magnets, and means to effect the printing of the selected character on the breaking of the third impulse.

42. In a telegraph typewriter the combination of a type wheel, a series of electromagnets to determine the position of said wheel, normally open circuits in which said magnets are included, means for energizing a set of said magnets in a predetermined sequence for a given letter or other symbol by successive impulses, a series of working magnets and circuits therefor, a commutator included in said last-named circuits, said commutator being so disposed as to prevent the closing of the working circuits until the breaking of the last impulse.

43. In a telegraph typewriter the combination of a type wheel, a series of electromagnets to determine the position of said wheel, normally open operating circuits in which said magnets are included, a holding circuit carrying a relatively weak current including all the controller magnets, said holding circuit being adapted to maintain the controller magnets energized when the operating circuits are open, means for momentarily opening the holding circuit upon the coming in of each impulse, and means for opening said circuit and holding the same open after the printing operation and until the parts included in the holding circuit are restored to normal position.

44. In a telegraph typewriter the combination of a type wheel, a series of electromagnets to determine the position of said wheel, normally open operating circuits in which said magnets are included, means for energizing a set of said magnets in a predetermined sequence for a given letter or other symbol by successive impulses, a holding circuit carrying relatively weak current including all the controller magnets, said holding circuit being adapted to maintain the controller magnets energized when the operating circuits are open, and means to momentarily open said holding circuit upon the coming in of each impulse.

In testimony whereof I have hereunto signed my name in the presence of two subscribing witnesses.

GEORGE A. CARDWELL.

Witnesses:
M. E. McNINCH,
CHARLES S. JONES.